(12) United States Patent
Lee

(10) Patent No.: US 8,775,627 B2
(45) Date of Patent: Jul. 8, 2014

(54) DISCONTINUOUS ACCESS MANAGEMENT METHOD USING WAITING TICKET FOR RESOURCE ALLOCATION CONTROL, WAITING TICKET MANAGEMENT METHOD, AND RESOURCE ALLOCATION CONTROL METHOD

(75) Inventor: Ho-Kyoung Lee, Bucheon-si (KR)

(73) Assignee: Aim To G Co., Ltd, Seoul (KR)

( * ) Notice: Subject to any disclaimer, the term of this patent is extended or adjusted under 35 U.S.C. 154(b) by 145 days.

(21) Appl. No.: 12/988,534

(22) PCT Filed: Apr. 23, 2009

(86) PCT No.: PCT/KR2009/002121
§ 371 (c)(1),
(2), (4) Date: Oct. 19, 2010

(87) PCT Pub. No.: WO2009/131387
PCT Pub. Date: Oct. 29, 2009

(65) Prior Publication Data
US 2011/0035499 A1    Feb. 10, 2011

(30) Foreign Application Priority Data

Apr. 24, 2008   (KR) ........................ 10-2008-0038087
Aug. 12, 2008   (KR) ........................ 10-2008-0078795
Aug. 12, 2008   (KR) ........................ 10-2008-0078797

(51) Int. Cl.
*G06F 15/173* (2006.01)

(52) U.S. Cl.
USPC ....................................................... 709/226

(58) Field of Classification Search
USPC ....................................................... 709/226
See application file for complete search history.

(56) References Cited

U.S. PATENT DOCUMENTS 5,706,515 A    1/1998  Connelly et al.
6,895,585 B2 *  5/2005  Smith ........................... 718/103
7,257,419 B2 *  8/2007  Hunzinger .................... 455/510

(Continued)

FOREIGN PATENT DOCUMENTS

CN    1244318    2/2000
CN    1719414    1/2006

(Continued)

OTHER PUBLICATIONS

State Intellectual Property Office of the People's Republic of China, First Notification of Office Action of Application No. 200980114533.X (Mar. 7, 2013).

*Primary Examiner* — Oscar Louie
*Assistant Examiner* — Younes Naji
(74) *Attorney, Agent, or Firm* — Lexyoume IP Meister, PLLC

(57) ABSTRACT

According to the present invention, it is determined whether to allocate a resource to a user having accessed without having a waiting ticket that indicates an access sequence number of the user terminal, and re-access of the user terminal after a waiting time is instructed by providing a waiting ticket and the waiting time to the user terminal if the user terminal cannot be allocated with the resource, and it is determined whether to allocate a resource to the user terminal having accessed with the waiting ticket and the resource is allocated to the user terminal if it is possible. If the resource cannot be allocated to the re-accessed user terminal, a waiting ticket and a waiting time are provided to the user terminal to instruct to access again after the waiting time has passed.

15 Claims, 12 Drawing Sheets

(56) References Cited

U.S. PATENT DOCUMENTS

| | | | |
|---|---|---|---|
| 7,334,229 B1 * | 2/2008 | McDonald et al. | 718/104 |
| 7,595,905 B2 * | 9/2009 | Matsugashita | 358/1.15 |
| 8,204,999 B2 * | 6/2012 | Crosbie et al. | 709/229 |
| 2002/0099671 A1 | 7/2002 | Mastin Crosbie | |
| 2004/0120484 A1 * | 6/2004 | Buzbee | 379/93.17 |
| 2005/0053029 A1 * | 3/2005 | Lee et al. | 370/328 |
| 2006/0010451 A1 * | 1/2006 | Lenk | 718/105 |
| 2006/0277550 A1 * | 12/2006 | Williams et al. | 718/107 |
| 2008/0077721 A1 | 3/2008 | Terakawa | |
| 2008/0133811 A1 * | 6/2008 | Lu et al. | 710/244 |
| 2009/0129358 A1 * | 5/2009 | Miyashita | 370/342 |

FOREIGN PATENT DOCUMENTS

| | | |
|---|---|---|
| JP | 11-085647 | 3/1999 |
| JP | 11-249975 | 9/1999 |
| JP | 2001-251424 | 9/2001 |
| JP | 2001-265693 | 9/2001 |
| JP | 2002-014922 | 1/2002 |
| JP | 2002-141936 | 5/2002 |
| JP | 2002-149519 | 5/2002 |
| JP | 2002-189650 | 7/2002 |
| JP | 2002-222123 | 8/2002 |
| JP | 2004-080187 | 3/2004 |
| JP | 2006-155578 | 6/2006 |
| JP | 2007-088580 | 4/2007 |
| KR | 10-2005-017947 | 2/2005 |
| KR | 10-2005-0120803 | 12/2005 |
| KR | 10-2007-0076374 | 7/2007 |
| KR | 10-2006-008796 | 1/2008 |

* cited by examiner

FIG. 11

| Waiting list | |
|---|---|
| Waiting ID | TimeStamp |
| xxxx1 | hh:mm:ss |
| xxxx2 | hh:mm:ss |
| xxxx3 | hh:mm:ss |

FIG. 12

| Allocation list | |
|---|---|
| Waiting ID | TimeStamp |
| xxxx1 | hh:mm:ss |
| xxxx2 | hh:mm:ss |
| xxxx3 | hh:mm:ss |

DISCONTINUOUS ACCESS MANAGEMENT METHOD USING WAITING TICKET FOR RESOURCE ALLOCATION CONTROL, WAITING TICKET MANAGEMENT METHOD, AND RESOURCE ALLOCATION CONTROL METHOD

TECHNICAL FIELD

The present invention relates to a resource allocation control method of a network system and a method for managing access of a user terminal for the same.

BACKGROUND ART

In general, when too many users access a network within a short period time, a network system such as a web server or a WAP server delays access processes or the network system goes down.

Such a problem occurs because the network system processes access of too many users with a limited amount of resources, and particularly, the network system processes the access while maintaining access with all the users.

Currently, an additional server is provided to process access of the users to solve the problem.

When the number of servers is increased, requests of the users may be received, but a device such as a database or a web application server (WAS) that uses a limited amount of resources has a limit in processing capability so that excessive requests of the users cannot be processed. In addition, when the requests of users exceed a predetermined level, not only processing of the corresponding request but also all the services related to the limited resource are influenced thereby so that all services cannot be smoothly provided. Further, increasing the number of servers requires additional cost for the number of increased servers.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to enable a service processor to stably perform without excessively loading a network system even though more than a limited number of users that can be processed with a limited resource access the network system.

Technical Solution

According to an exemplary embodiment of the present invention, a discontinuous access management method using a waiting ticket is provided for resource allocation control in a network system that enables use of services by allocating a resource to a user terminal. The discontinuous access management method includes: a) checking whether a resource can be allocated to a first user terminal that has accessed without a waiting ticket that indicates an access sequence number of the first user terminal; b) in the case that the resource cannot be allowed, providing the first user terminal with the waiting ticket that indicates the access sequence number of the first user terminal and a waiting time that informs of a re-access time of the first user terminal; c) releasing the access of the first user terminal provided with the waiting ticket and the waiting time; d) checking whether the resource can be allocated to the first user terminal accessed with the waiting ticket; and e) allocating the resource in the case that the first user terminal can be allocated with the resource, and performing b) in the case that the first user terminal cannot be allocated with the resource.

According to another exemplary embodiment of the present invention, a waiting ticket management method is provided for resource allocation control in a network system that enables use of services by allocating a resource to a user terminal. The waiting ticket management method includes: a) issuing a waiting ticket corresponding to a user terminal accessed without a waiting ticket that indicates an access sequence number of the user terminal; b) registering a waiting ticket of a user terminal that is not allocated with the resource in a waiting list, and registering a waiting ticket of a user terminal that is allocated with the resource in an allocation list; and c) deleting a waiting ticket of a user terminal that has finished using the resource.

According to another exemplary embodiment of the present invention, a waiting ticket management is provided for resource allocation control performed between a plurality of waiting ticket issuing devices and a service controller. The waiting ticket management method includes: a) checking whether a first device among the plurality of waiting ticket issuing devices can issue a waiting ticket from a first waiting ticket block set thereby to a user terminal having accessed without having a waiting ticket, the waiting ticket indicating an access sequence number of the user terminal, and the first waiting ticket block including a first number of waiting tickets ordered in series; b) requesting a new waiting ticket block from the service controller when the first waiting ticket block does not have a waiting ticket to be issued in the first device; c) in the service controller, when receiving the request for the new waiting ticket block from the first device, providing a second waiting ticket block to all of the waiting ticket issuing devices, the second waiting ticket block including the first number of waiting tickets that are sequential to a waiting ticket having the largest sequence number in the first waiting ticket block; d) setting the second waiting ticket block as a waiting ticket block for issuing of a waiting ticket in each of the plurality of waiting ticket issuing devices; and e) in the first device, issuing a waiting ticket from the second waiting ticket block and providing the waiting ticket to the user terminal.

According to another exemplary embodiment of the present invention, a resource allocation control method is provided. The resource allocation control method includes: a) providing a waiting ticket to a user terminal accessed without having a waiting ticket that indicates an access sequence number; b) registering the waiting ticket provided to the user terminal in a waiting list; c) at least, calculating an empty resource per second (EPS) by using an allocation list to which a waiting ticket in use of a resource is registered, and setting an allowable access sequence number by using the EPS and the waiting list, the EPS indicating the number of waiting tickets that have finished use of resource per second; d) comparing an access sequence number of a waiting ticket of a user terminal that requests resource allocation with the allowable access sequence number to determine whether to allocate the resources; and e) after deleting a waiting ticket of a user terminal allocated with the resources from the waiting list, registering the deleted waiting ticket in the allocation list.

Advantageous Effects

According to the above-described exemplary embodiment, connection with a user that cannot use a resource is disconnected and the user is allowed to automatically re-access after a waiting time so as to prevent deterioration of the system due to continuous access of the user.

In addition, according to the present invention, the number of users using the resource is maintained at a predetermined level to protect a limited resource and smoothly provide services to the users.

BRIEF DESCRIPTION OF THE DRAWINGS

FIG. 11 shows a waiting list according to the exemplary embodiment of the present invention.

FIG. 12 shows an allocation list according to the exemplary embodiment of the present invention.

BEST MODE

Figure 1:
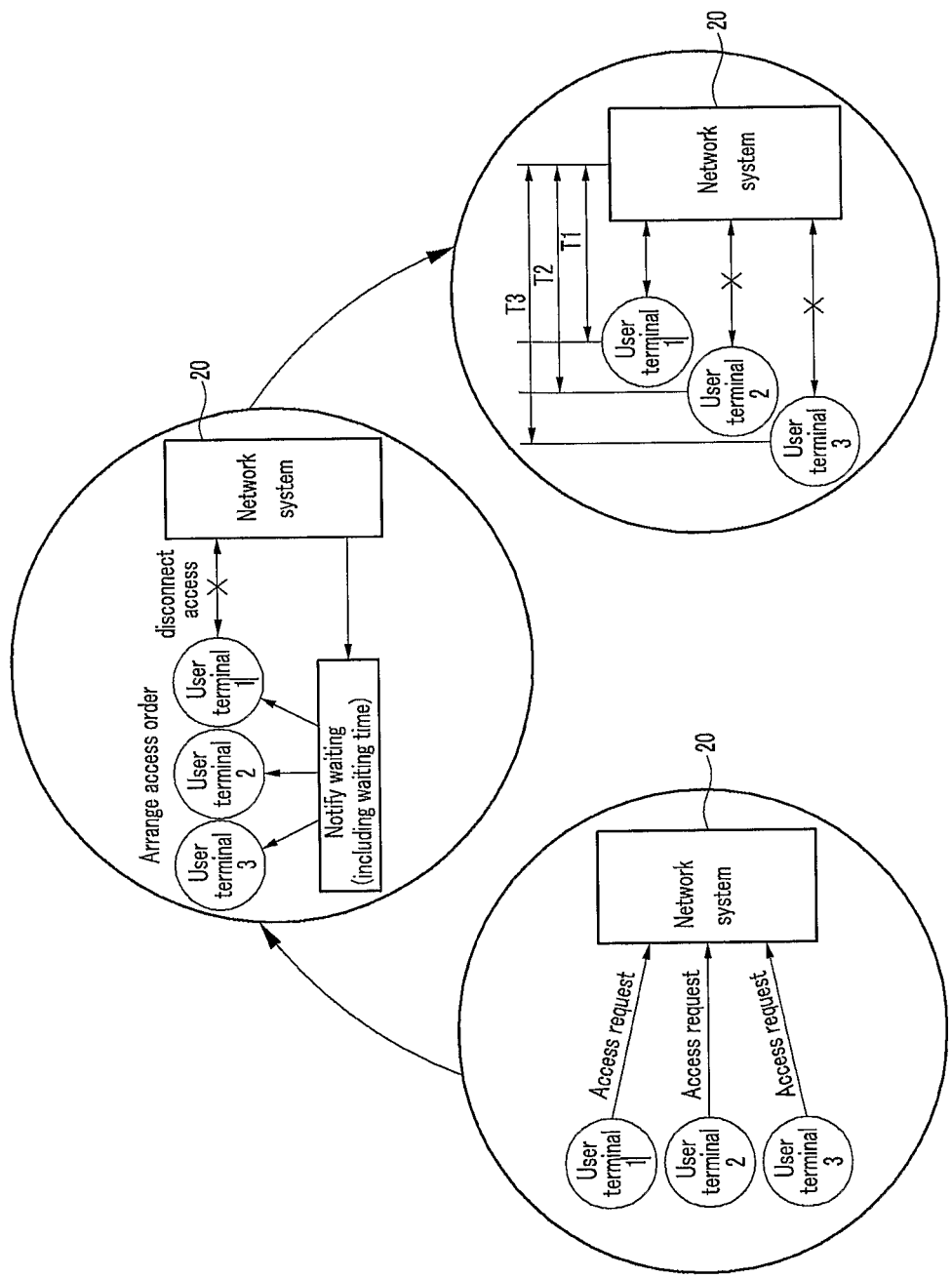
FIG. 1 is a schematic view for describing a discontinuous access management method using a waiting ticket for resource allocation control according to the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

With reference to the accompanying drawings, a discontinuous access management method using a waiting ticket for resource allocation control and a waiting ticket managing method according to an exemplary embodiment of the present invention will be described.

FIG. 1 is a schematic view for describing a discontinuous access management method using a waiting ticket for resource allocation control according to the present invention. In this exemplary embodiment, the number of service users is three. However, the number of service users is not limited to three, and user terminals that can access a network system of the present invention can be service targets.

User terminals 1, 2, and 3 access a network system 20 of the present invention by using a general method.

In this case, an access order to the network system 20 is assumed to be that the user terminal 1 is first, the user terminal 2 is second, and the user terminal 3 is third.

When resources cannot be allocated to the user terminals 1, 2, and 3, the network system 20 transmits a waiting notification message to the user terminals 1, 2, and 3 according to the access order.

The waiting notification message includes a waiting ticket and a waiting time. The waiting ticket refers to an identifier (ID) that indicates an access order (hereinafter, referred to as an access sequence number) of the corresponding user terminal to the network system 20.

The waiting ticket may also function as a waiting ID that instructs a user terminal to wait for access. If the waiting ticket does not function as the waiting ID, the waiting identifier may be included in header information or a payload of the waiting notification message separately from the waiting ticket. Here, the access wait refers to disconnecting the access with the network system 20 and waiting for reconnection therebetween.

The waiting time refers to an access waiting time before the user terminal can re-access the network. That is, the waiting time is a notification of a time to re-access the network system 20 to a user terminal that terminates connection with the network system 20 according to the waiting notification message.

In response to the waiting notification message, the user terminals 1, 2, and 3 check a waiting identifier included in the waiting notification message to terminate access with the network system 20, and re-access the network system 20 after waiting for a waiting time. Here, access termination between the user terminal and the network system may be performed by the user terminal, or may be performed by the network system.

It is assumed that a waiting time provided to the user terminal 1 from the network system 20 is T1, a waiting time provided to the user terminal 2 from the network system 20 is T2, and a waiting time provided to the user terminal 3 from the network system 20 is T3. The waiting times T1, T2, and T3 may be the same or different.

When the waiting times T1, T2, and T3 are the same, it is preferred that each of the waiting times T1, T2, and T3 is set to a predetermined default value. Even when the waiting times T1, T2, and T3 are the same, re-access times of the respective user terminals 1, 2, and 3 are different from each other. This is because each of the user terminals 1, 2, and 3 has a different access time so that each of the user terminals 1, 2, and 3 is provided with a waiting time from the network system 20 at a different time.

When the waiting times T1, T2, and T3 are different from each other, the respective waiting times T1, T2, and T3 are determined according to the number of user terminals waiting, and a waiting time is increased as the access times become later. For example, the waiting time T1 provided to the user terminal 1 is the longest waiting time, the waiting time T2 provided to the user terminal 2 is shorter than the waiting time T1, and the waiting time T3 provided to the user terminal 3 is the shortest waiting time.

That is, regardless of whether the waiting times are the same or different from each other, re-access of the user terminal 1 is performed earlier than the user terminals 2 and 3, and re-access of the user terminal 2 is performed earlier than the user terminal 3.

As described, each of the user terminals is set to re-access in the same order as an initial access order so that a user terminal that accessed earlier than other user terminals can be allocated with resources prior to other user terminals in a condition that resources can be used according to the present invention.

In the case that a re-accessed user terminal cannot be allocated resources, a waiting notification message that includes a waiting ticket and a waiting time is transmitted to the re-accessed user terminal again according to the present invention.

Meanwhile, when a user terminal accesses, the network system 20 provides the user terminal with a waiting ticket that matches a unique ID (e.g., IP address, cellular phone number, etc.) of the accessed user terminal. In this case, the network system 20 generates a waiting ticket having a minimum access sequence number that has not internally duplicated and provides the generated waiting ticket to the user terminal.

Here, the unduplicated minimum access sequence number implies the minimum number among numbers that have not been provided to other user terminals, and also implies that access sequence numbers are provided according to a predetermined rule. The predetermined rule implies increment by 1 (e.g., 1, 2, 3, . . . ) or increment by 2 (e.g., 1, 3, 5, 7, . . . , or 2, 4, 6, 8, . . . ).

The network system 20 checks a unique ID and a waiting ticket that matches the unique ID of each user terminal whenever a user terminal accesses to identify an access order of the user terminal, and checks the next user terminal to be allocated with resources accordingly.

In addition, based on the waiting ticket, the network system 20 manages a list (hereinafter, referred to as a waiting list) of user terminals that have transmitted a waiting notification message and a list (hereinafter, referred to as an allocation list) of user terminals that have been allocated with resources.

Resource allocation to the user terminal can be controlled through the discontinuous access and the management of the waiting list and the allocation list according to the present invention.

Hereinafter, referring to FIG. 2, a discontinuous access management method using a waiting ticket for resource allocation control according to a first exemplary embodiment of the present invention that achieves the concept of the present invention of FIG. 1 will be described.

Figure 2:
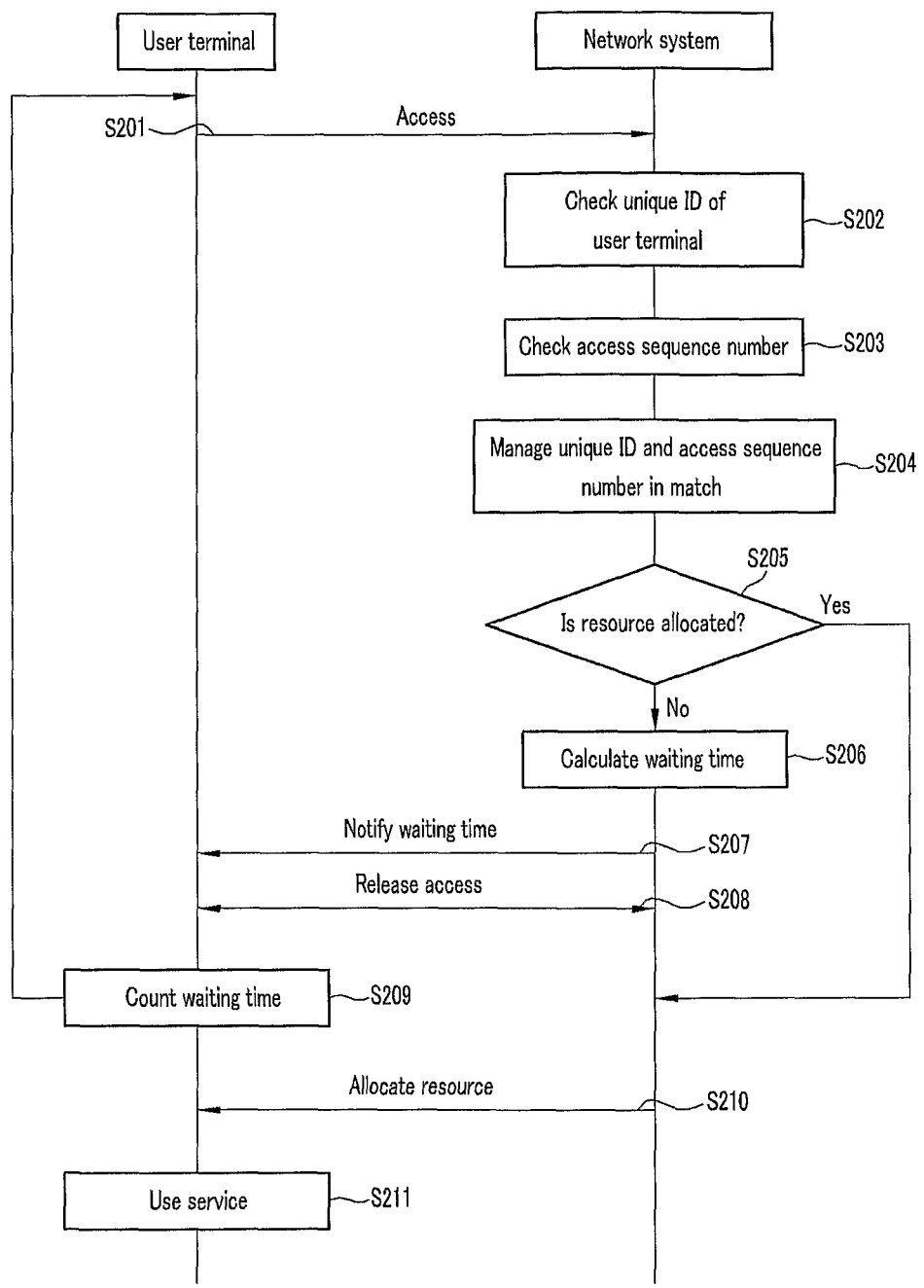
FIG. 2 is a data flow chart of a discontinuous access management method using a waiting ticket for resource allocation control according to a first exemplary embodiment of the present invention.

FIG. 2 is a flowchart of a discontinuous access management method using a waiting ticket for resource allocation control according to the first exemplary embodiment of the present invention. Hereinafter, all the user terminals will be commonly designated as a user terminal 100.

A user performs the first access to the network system 20 through a user terminal 100 (S201).

Then, the network system 20 checks a unique ID of the accessed user terminal 100 (S202), generates a first waiting ticket that indicates a minimum number that can be provided in the current circumstance (S203), and stores the first waiting ticket together with the checked ID (S204).

Then, the network system 20 determines whether to allocate a resource to the user terminal 100 (S205).

If there are many previously accessed user terminals, each having a waiting ticket that is earlier than the first waiting ticket of the user terminal 100, and the currently available amount of resources is insufficient for the previously accessed user terminals, the user terminal 100 cannot be allocated with the resource.

The network system 20 allocates the resource if no user terminal having a waiting ticket that is earlier than the first waiting ticket has been previously accessed or very few of them exist, and the currently available amount of resources is sufficient for all the previously accessed user terminals.

If it is determined in the step S205 that the network system 20 cannot allocate the resource to the user terminal 100, the network system 20 calculates a primary waiting time to be provided to the user terminal 100 by using the amount of available resources and the number of accessed user terminals 100 in the waiting state (S206). The primary waiting time is decreased as the amount of available resources is increased or as the number of previously accessed user terminals is decreased, and is increased as the amount of available resources is decreased or as the number of previously accessed user terminals is increased.

In addition, the network system 20 provides a waiting notification message that includes the primary waiting time and the first waiting ticket to the user terminal 10 (S207).

The user terminal 100 receives the waiting notification message, checks a waiting ID of the waiting notification message, and releases the access with the network system 20 (S208). Then, the user terminal 100 counts a waiting time until reaching a waiting time included in the received waiting notification message (S209), and re-accesses the network system 20 at termination of the waiting time (S201).

If the network system 20 determines in the step S205 that it is possible to allocate the resource to the user terminal 100, the network system 20 allocates the resource to the user terminal 100 (S210). Then, the user terminal 100 uses services by using the allocated resource (S211).

If the user terminal 100 does not access the network system 20 at a first time when the primary waiting time is terminated or within a valid time set from the first time, the network system 20 deletes the stored waiting ticket that matches the unique ID of the user terminal 100.

If the user terminal 100 cannot be allocated with a resource even though the user terminal 100 re-accesses the network system 20, the network system 20 provides a waiting notification message again to the user terminal 100. In this case, the waiting notification message includes a newly calculated secondary waiting time and the first waiting ticket.

Next, referring to FIG. 3, a discontinuous access management method using a waiting ticket for resource allocation control according to a second exemplary embodiment of the present invention that achieves the concept of the present invention of FIG. 1 will be described.

Figure 3:
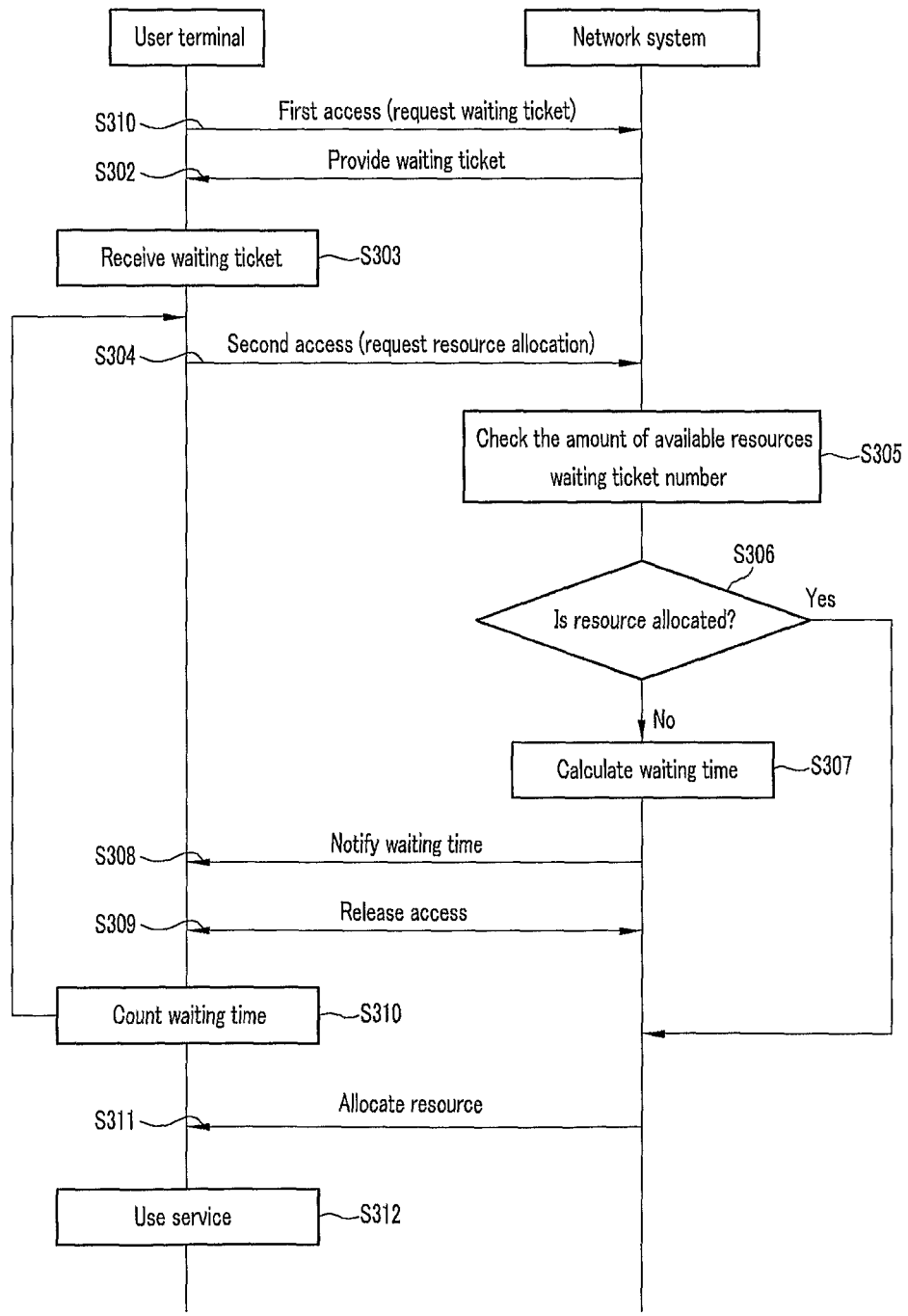
FIG. 3 is a data flow chart of a discontinuous access management method using a waiting ticket for resource allocation control according to a second exemplary embodiment of the present invention.

FIG. 3 is a flowchart of a discontinuous access management method using a waiting ticket for resource allocation control according to the second exemplary embodiment of the present invention. Hereinafter, all the user terminals will be commonly designated as a user terminal 100.

A user performs the first access to a network system 20 through a user terminal 100 to request issuing of a waiting ticket (S301).

The first access refers to an access of a user terminal 100 that does not have a waiting ticket to the network system 20, and hereinafter, it will be referred to as a waiting ticket request access to the network system 200.

When receiving the ticket issuing request, the network system 20 checks a unique ID of the accessed user terminal 100, generates a first waiting ticket that indicates a minimum number that can be provided in the current circumstance, and stores the first waiting ticket together with the matching checked unique ID.

In addition, the network system 20 provides the first waiting ticket to the user terminal 100 (S302).

The user terminal 100 receives the waiting ticket (S303), and performs a second access to the network system 20 (S304). The second access implies that the user terminal 100 accesses the network system 20 by using a waiting ticket provided thereto, and hereinafter, it will be referred to as a resource allocation request access to the network system 20.

The network system 20 checks a waiting sequence number of the user terminal 100 by using the first waiting ticket and checks the amount of available resources (S305). Then, the network system 20 determines whether it is possible to allocate a resource to the user terminal 100 through the checking of the step S305 (S306).

If there are many previously accessed user terminals, each having a waiting ticket that is earlier than the first waiting ticket of the user terminal 100 and the currently available amount of resources is not sufficient for the previously accessed user terminals, the network system 20 does not allocate resources. The network system 20 allocates the resource if no user terminal having a waiting ticket that is earlier than the first waiting ticket has previously accessed or a very few of them exist and the currently available amount of the resources is sufficient for all the previously accessed user terminals.

A previously accessed user terminal implies a user terminal having a waiting ticket of which a sequence number is earlier than a random waiting ticket.

If the network system 20 determines in the step S306 that the network system 20 cannot allocate the resource to the user terminal 100, the network system 20 calculates a primary waiting time to be provided to the user terminal 100 by using the amount of available resources and the number of accessed user terminals in the waiting state (S307). The primary waiting time is decreased as the amount of available resources is increased or as the number of previously accessed user terminals is decreased, and is increased as the amount of available resources is decreased or as the number of previously accessed user terminals is increased.

In addition, the network system 20 provides a waiting notification message that includes the primary waiting time and the first waiting ticket to the user terminal 100 (S308).

Then, the user terminal 100 receives the waiting notification message and simultaneously releases the access with the network system 20 (S309), counts a waiting time (S310), and performs the second access to the network system 20 at termination of the counting of the waiting time to request resource allocation.

The counting of the waiting time implies counting of a time from receiving of the primary waiting time to the primary waiting time. For example, if the waiting time is 10 seconds, the counting of the waiting time is to count 10 seconds from the receiving of the waiting time.

If the network system 20 determines in the step S306 that it is possible to allocate the resource to the user terminal 100, the network system 20 allocates the resource to the user terminal 100 (S311). Then, the user terminal 100 uses services by using the allocated resource (S312).

If the user terminal 100 cannot be allocated with a resource even though the user terminal 100 performs the second access to the network system 20 again, the network system 20 provides a waiting notification message again to the user terminal. In this case, the waiting notification message includes a newly calculated secondary waiting time and the first waiting ticket.

Figure 4:
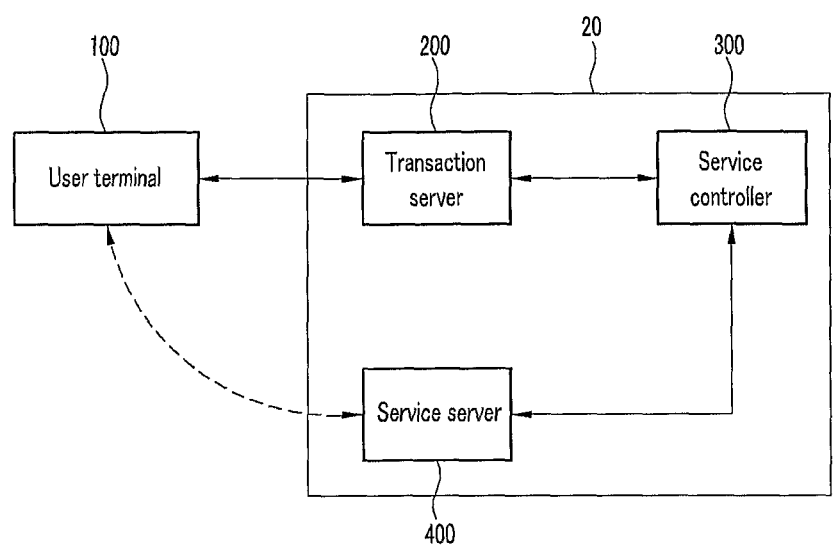
FIG. 4 is a block diagram of a network system according to an exemplary embodiment of the present invention.

Hereinafter, a network system according to an exemplary embodiment for realizing the first and second exemplary embodiments of the present invention will be described with reference to FIG. 4. FIG. 4 is a block diagram of a network system according to an exemplary embodiment of the present invention.

As shown in FIG. 4, a network system 20 according to the exemplary embodiment of the present invention includes a transaction server 200, a service controller 300, and a service server 400.

The transaction server 200 functions as an interface with a user terminal 100 so that the user terminal 100 may access the service server 400 or commands it to wait for access. The transaction server 200 includes its access ID in a waiting notification message and provides the waiting notification message to the user terminal 100 in order to notify the user terminal 100 to re-access the transaction server 200 when the user terminal 100 performs re-access. The access ID may be an ID that informs access to the transaction server 200, or may be address information.

When the user terminal 100 accesses, the transaction server 200 checks a waiting ticket that can be provided to the user terminal 100. If the waiting ticket is checked, the transaction server 200 provides the waiting ticket to the user terminal 100 and stores the waiting ticket by matching it with an ID of the user terminal 100. In addition, the transaction server 200 checks whether the user terminal 100 is located within a range in which a resource can be allocated to determine access allowance based on the allocated waiting ticket, and calculates a waiting time for a waiting ticket that cannot allow access and provides the calculated waiting time.

In addition, when providing the waiting ticket to the user terminal 100, the transaction server 200 registers (or adds) a waiting ticket (or access sequence number) in a waiting list.

Here, the waiting list has a structure, for example, as shown in FIG. 11. FIG. 11 shows a waiting list according to the exemplary embodiment of the present invention.

As shown in FIG. 11, the waiting list includes a field for a waiting ticket and a field for a waiting ticket registration time corresponding to the waiting ticket.

The waiting list arranges and registers a waiting ticket according to a waiting sequence number, and has a predetermined size. That is, a predetermined number of waiting tickets can be registered in the waiting list. The waiting list has the predetermined size in order to prevent overhead. This is because, when the size of the waiting list is not fixed, the size of the waiting list becomes too large when too many access requests of user terminals are registered therein at one time so that overhead occurs when arranging the waiting list or deleting an access request.

A new user terminal may be added to the waiting list in the case that the waiting list having the predetermined size is full. In this case, a waiting ticket of the new user terminal is not registered (added) in the waiting list, and only a waiting time is calculated and provided to the user terminal.

In addition, when the transaction server 200 allows the access of a user terminal 100, the transaction server 200 registers (adds) a waiting ticket of the user terminal 100 in the allocation list.

Here, the allocation list has a structure, for example, as shown in FIG. 12. FIG. 12 shows an allocation list according to the exemplary embodiment of the present invention.

As shown in FIG. 12, the allocation list includes a field for a waiting ticket and a field for a waiting ticket registration time corresponding to the waiting ticket. Such an allocation list has an arbitrary size so that a waiting ticket of a user terminal can be registered without regard to the number of waiting tickets.

The service controller 300 controls operation of the transaction server 200 to control the number of user terminals 100 that can approach resources of the service server 400 according to a resource use state of the service server 400, which is changed in interaction with operation of the transaction server 200. For this, the service controller 300 sets a range of waiting tickets that can be issued to the transaction server 200, and provides basic information for waiting time calculation and access allowance in consideration of a resource use state of the service server 400 and the number of previously accessed user terminals.

The service server 400 allocates a resource to a user terminal 100 of which access is allowed by the transaction server 200 and provides services requested by the user terminal 100.

In the exemplary embodiment of the present invention shown in FIG. 4, each of the elements 200, 300, and 400 are independently separated so that a user should separately access the transaction server 200 and the service server 400. However, the present invention is not limited thereto.

That is, the transaction server 200, the service controller 300, and the service server 400 may be integrally provided according to the present invention. For example, a function of the transaction server 200 and a function of the service controller 300 may be included in the service server 400 in design of the service server 400. In this case, for example, the access allowance provided to the user terminal 100 may be replaced with an internal signal process between the function of the transaction server and the function of the service server.

Figure 5:
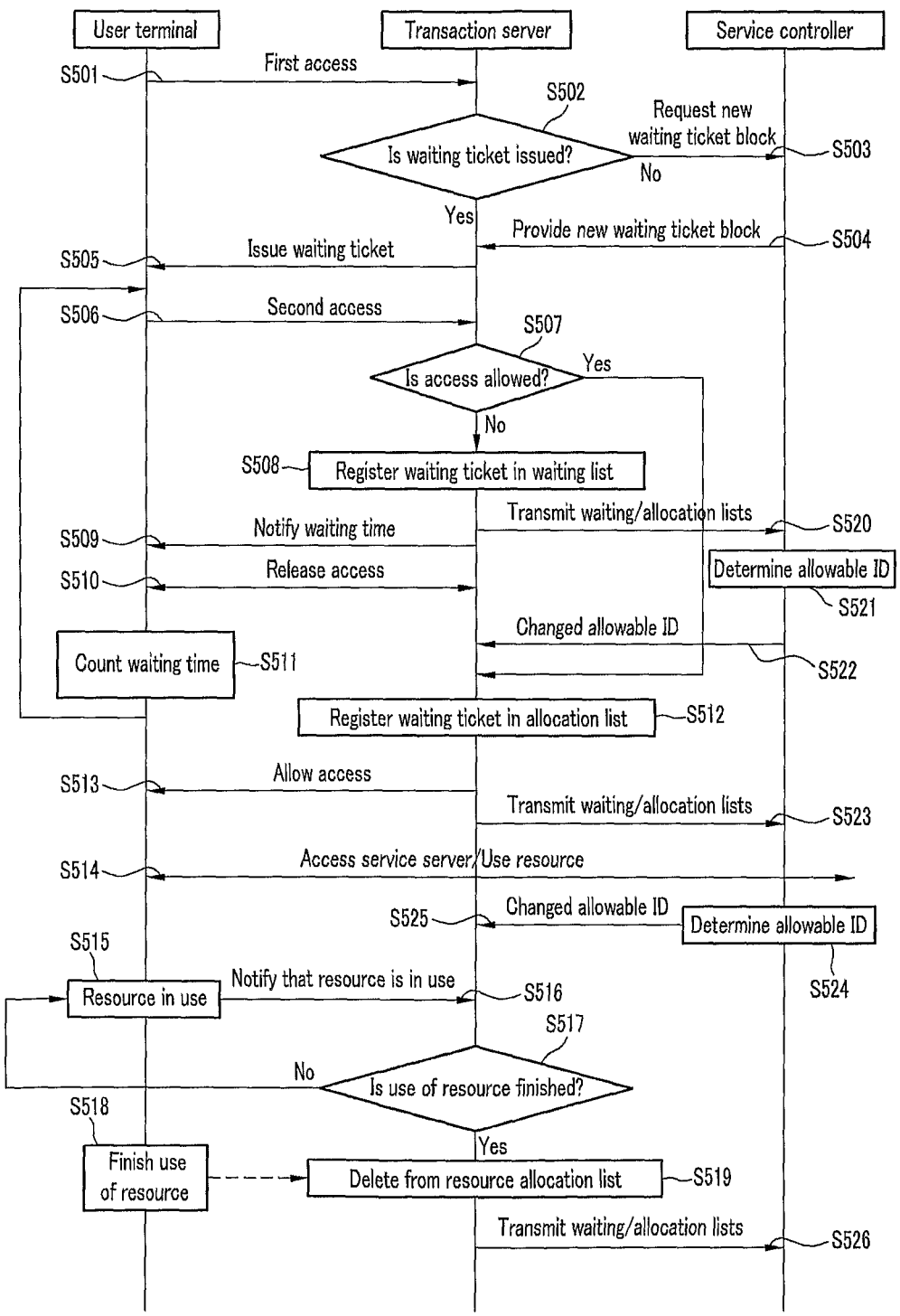
FIG. 5 is a data flowchart where the waiting ticket management method for resource allocation control according to the exemplary embodiment of the present invention based on FIG. 4 and the resource allocation control method are mixed.

With reference to FIG. 5, a waiting ticket management method and a resource allocation control method for resource allocation control according to an exemplary embodiment of the present invention will now be described. FIG. 5 is a data flowchart where the waiting ticket management method for resource allocation control according to the exemplary embodiment of the present invention based on FIG. 4 and the resource allocation control method are mixed, and is based on the configuration of the network system shown in FIG. 4.

In the following description, the waiting ticket management method for resource allocation control according to the present invention is used in interaction with the discontinuous access management method using the waiting ticket for resource allocation control according to the present invention.

Hereinafter, referring to FIG. 5, a waiting ticket management method for resource allocation control according to an exemplary embodiment of the present invention that interacts with the discontinuous access management method for the resource allocation control according to the second exemplary embodiment of the present invention will be described.

A person of an ordinary skill in the art can easily understand the waiting ticket management method for the resource allocation control according to the exemplary embodiment of the present invention that interacts with the discontinuous access management method for resource allocation control according to the first exemplary embodiment of the present invention through the description with reference to FIG. 5, and therefore no further description will be provided.

A user terminal 100 requests an access from a service server 400 in order to use services provided from the service server 400. Since the access of the user terminal 100 is not yet allowed by a transaction server 200, the service server 400 commands the user terminal 100 to access the transaction server 200.

Then, the user terminal 100 performs a first access to the transaction server 200 (S501).

Upon the first access of the user terminal 100, the transaction server 200 determines whether a waiting ticket that can be provided to the user terminal 100 exists in a registered waiting ticket block (S502).

If the transaction server 200 determines in the step of S502 that the waiting ticket cannot be issued, the transaction server 200 requests a new waiting ticket block from the service controller 300 (S503), and receives the new waiting ticket block from the service controller 300 and registers the received waiting ticket block (S504).

However, it the transaction server 200 determines in the step S502 that the waiting ticket can be issued, the transaction server 200 issues the earliest waiting ticket among available waiting tickets in the registered waiting ticket block to the user terminal 100 (S505).

Here, the waiting ticket block is a set of waiting tickets arranged in series. For example, the waiting ticket block may be a set of waiting tickets numbered from 1 to 100, or may be a set of waiting tickets numbered from 300 to 500.

When receiving the waiting ticket, the user terminal 100 performs a second access and presents the waiting ticket to request resource allocation (S506).

Accordingly, the transaction server 200 compares a sequence number of the waiting ticket presented by the user terminal 100 with a predetermined allowable ID to determine whether the access can be allowed (S507). Here, the allowable ID is the maximum-numbered waiting ticket that is allowed to access, that is, an access sequence number. (i.e., the same as an allowable access sequence number in claims)

The transaction server 200 determines that the access can be allowed if the waiting ticket number is smaller than the allowable ID. Otherwise, the transaction server 200 determines not to allow the access.

If it is determined that the access cannot be allowed in the determination (S507), the transaction server 200 registers (adds) the waiting ticket to the waiting list (S508), and calculates a waiting time corresponding to the amount of available resources and the number of user terminals in the waiting state based on waiting tickets and informs the calculated waiting time to the user terminal 100 (S509).

When receiving the waiting time, the user terminal 100 releases the access with the transaction server 200 (S510), counts the waiting time (S511), and performs the second access again at termination of the waiting time again to request resource allocation (S506).

If it is determined that the access can be allowed in the determination (S507), the transaction server 200 deletes the waiting ticket from the waiting list and registers (adds) the waiting ticket to the allocation list (S512), and transmits an access allowance message for notification of the access allowance to the user terminal 100 (S513).

Accordingly, the user terminal 100 accesses the service server 400 by using the received access allowance message, and the service server 400 checks that the user terminal 100 has accessed according to the access allowance message and allocates a resource to the user terminal 100 to that the user terminal 100 can use services with the resource (S514).

When using the services with the resource, while using the services (S515), the user terminal 100 transmits a notification message to notify that the services are in used at every predetermined time period to the transaction server 200 (S516).

The transaction server 200 monitors whether user terminals 100 corresponding to the respective waiting tickets registered in the allocation list use the resources or not (S517). In this case, the monitoring of the transaction server 200 is to check whether the notification message is received within the predetermined time period from the user terminal 100.

If the transaction server 200 receives the notification message within the predetermined time period from the user terminal 100 in the monitoring (S517), the transaction server 200 determines that the resources have been continuously used and maintains information on a current allocation list.

On the contrary, if the transaction server 200 does not receive the notification message within the predetermined time period from the user terminal 100 in the monitoring (S517), the transaction server 200 determines that the user terminal 100 no longer uses the resource (S518). In this case, the transaction server 200 removes (deletes) the waiting ticket of the user terminal 100 having finished using the resource from the allocation list (S519).

The transaction server 200 provides the waiting list and the allocation list to the service controller 300 at every predetermined time period (S520, S523, and S526).

Here, the transaction server 200 may be set to provide the waiting list and the allocation list to the service controller 300 in the case that a waiting ticket is registered in the waiting list, a waiting ticket is registered in the allocation list, or a waiting ticket is deleted from the allocation list.

When receiving the waiting list and the allocation list from the transaction server 200, the service controller 300 analyzes the resource use state checked from the service server 400 and the received waiting list and/or allocation list to determine a range of a waiting ticket that can access, and determines the determined waiting ticket as an allowable ID (S521 and S524).

When the allowable ID is determined, the service controller 300 provides the determined allowable ID to the transaction server 200 (S522 and S525). Then, the transaction server 200 deletes a pre-registered allowable ID and registers the allowable ID received from the service controller 300.

When providing the allowable ID to the transaction server 200, the service controller 300 provides an empty resource per second (EPS) value to the transaction server 200, together with the allowable ID. The service controller 300 calculates the EPS at every predetermined time period, and the transaction server 200 calculates a waiting time by using the EPS.

Hereinafter, a waiting ticket management method for resource allocation control according to the exemplary embodiment of the present invention, described with reference to FIG. 5, will be described in further detail with reference to FIG. 6 to FIG. 10.

Figure 6:
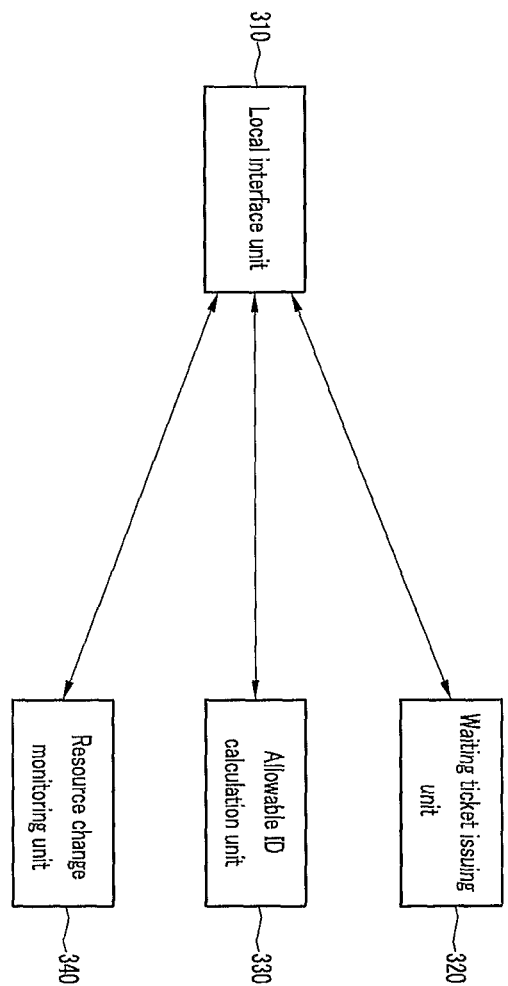
FIG. 6 is a block diagram of an exemplary embodiment that of a service controller of FIG. 3.

FIG. 6 is a block diagram of a detailed exemplary embodiment of the service controller of FIG. 3. As shown in FIG. 6, the service controller 300 includes a local interface unit 310, a waiting ticket block issuing unit 320, an allowable ID calculation unit 330, and a resource change monitoring unit 340.

The local interface unit 310 functions as an interface with the transaction server 200 and the service server 400.

When receiving a request of a new waiting ticket block from the transaction server 200, the waiting ticket block issuing unit 320 generates a new waiting ticket block having a predetermined size and provides the new waiting ticket block to the transaction server 200.

When providing the new waiting ticket block, the waiting ticket block issuing unit 320 checks information on a waiting ticket block that has been previously provided from the transaction server 200 and sets a waiting ticket block that is subsequent to the previously provided waiting ticket block as the next waiting ticket block and provides the same to the transaction server 200. For example, if the previously provided waiting ticket block includes waiting ticket 1 to waiting ticket 99, the waiting ticket block issuing unit 320 provides a waiting ticket block including waiting ticket 100 to waiting ticket 199 as the new waiting ticket block to the transaction server 200 (refer to FIG. 9).

The allowable ID calculation unit 330 calculates the allowable ID by using the waiting list and the allocation list received from the transaction server 200 and the resource use state of the service server 400 received from the resource change monitoring unit 340.

A method for calculating the allowable ID performed in the allowable ID calculation unit 330 will now be described in further detail.

The allowable ID calculation unit 330 firstly calculates an EPS for calculation of the allowable ID. There are many methods to calculate the EPS.

According to a first method, the allowable ID calculation unit 330 checks the allocation list at every predetermined time period (e.g., one second, two seconds, and five seconds, etc.) to checks the number of waiting tickets that have finished using the resource and are deleted from the list That is, the allowable ID calculation unit 330 determines the number of waiting tickets deleted from the allocation list during the predetermined time period. When the number of waiting tickets checked by the allowable ID calculation unit 330 is set to A and the predetermined time period is set to Ts, the EPS can be represented as A/Ts.

According to a second method, the EPS may include the number of user terminals that have released the access before receiving the access allowance from the service server 400 by not only using the allocation list but also by using the waiting list. In this case, the allowable ID calculation unit 330 obtains a difference of a sequence number of the smallest waiting ticket registered in the waiting list and a sequence number of the largest waiting ticket registered in the allocation list at every predetermined time period, and determines the EPS by dividing the sequence number difference by the predetermined time period.

When the EPS is obtained, the allowable ID calculation unit 330 checks available resources that can be currently used and calculates an allowable range by adding the number of acceptable user terminals for the allowable resources and the calculated EPS.

Then, the allowable ID calculation unit 330 sets a waiting ticket of the largest sequence number within the allowable range in the waiting list as the allowable ID. Here, the allowable ID calculation unit 330 does not unlimitedly increase the allowable range, but sets a limit of increase at once to prevent drastic changes in values.

The allowable ID calculation unit 330 provides the calculated EPS and the allowable ID to the transaction server 200.

The resource change monitoring unit 340 monitors the resources of the service server 400 to monitor if any change occurs above or below the predetermined level. That is, when the use of resources in the service server 400 exceeds a first predetermined level compared to the number of user terminals registered in the allocation list, the resource change monitoring unit 340 informs the excessive resource use to the allowable ID calculation unit 330 to thereby decrease the allowable range. On the contrary, when the use of resources in the service server 400 is lower than a second predetermined level compared to the number of user terminals registered in the allocation list, the resource change monitoring unit 340 informs this to the allowable ID calculation unit 330 to thereby increase the allowable range.

Figure 7:
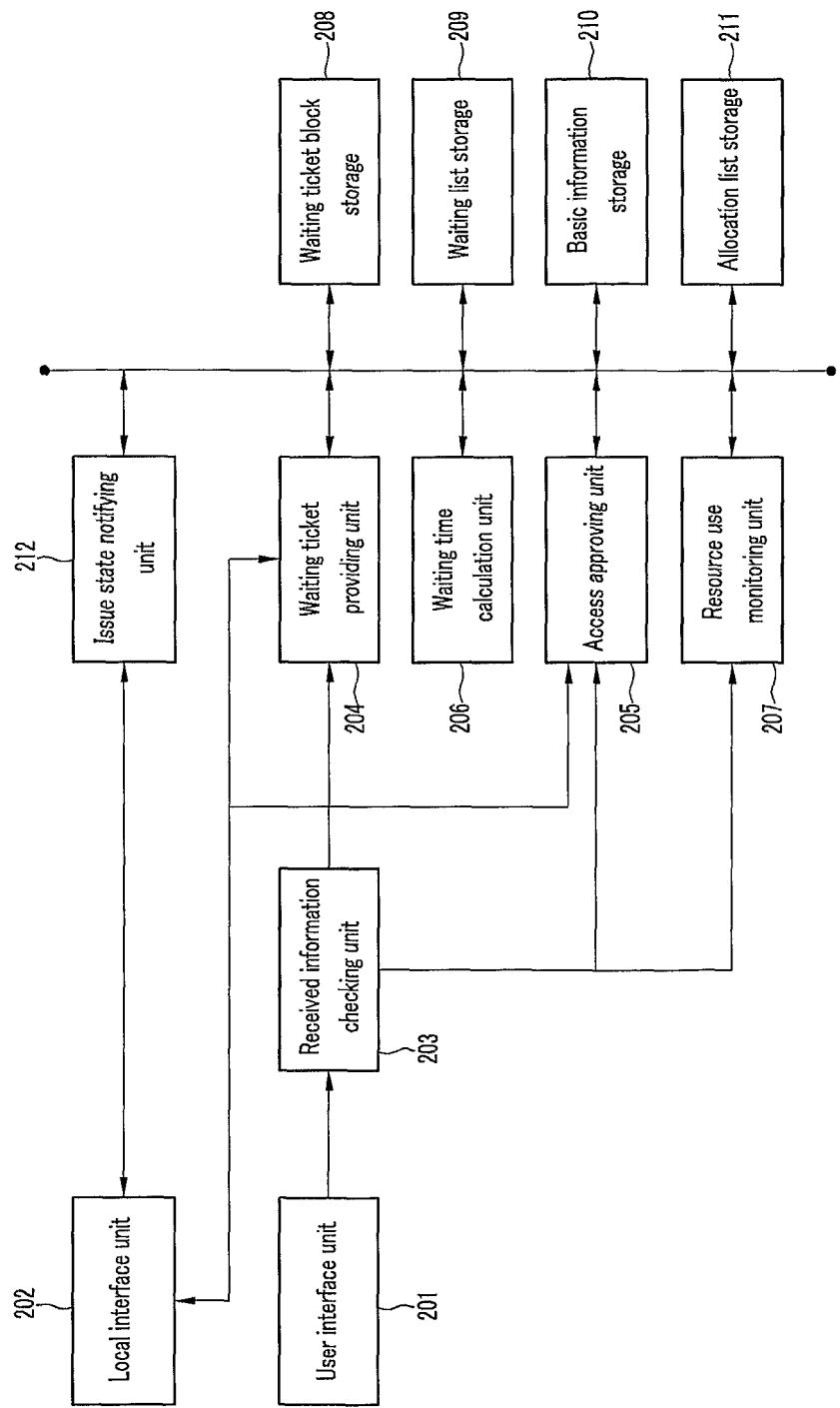
FIG. 7 is a block diagram of an exemplary embodiment of a transaction server of FIG. 3.

FIG. 7 is a block diagram of a detailed exemplary embodiment of the transaction server of FIG. 3. As shown in FIG. 7, the transaction server 200 includes a user interface unit 201, a local interface unit 202, a received information checking unit 203, a waiting ticket providing unit 204, an access approving unit 205, a waiting time calculation unit 206, a resource use monitoring unit 207, a waiting ticket block storage 208, a waiting list storage 209, a basic information storage 210, an allocation list storage 211, and an issue state notifying unit 212.

The user interface unit 201 functions as an interface with the user terminal 100, and the local interface unit 202 functions as an interface with the service controller 300.

The received information checking unit 203 analyzes a message received from the user interface unit 201 and transmits the message to an internal constituent element for processing of the message according to the analysis. Here, the message transmitted from the user interface unit 201 includes a message according to the first access, a message according to the second access, and a notification message that notifies of use of resources.

When receiving the message according to the first access, the waiting ticket providing unit 204 issues a waiting ticket to the corresponding user terminal 100 by using a waiting ticket block having a fixed size and that is stored in the waiting ticket block storage 208, and adds the issued waiting ticket in the waiting list. In this case, the waiting ticket includes a unique ID that can identify the transaction server 200. The unique ID enables the user terminal 100 to re-access an initially accessed transaction server.

When all the waiting tickets stored in the waiting ticket block storage 208 are used, the waiting ticket providing unit 204 requests a new waiting ticket block from the service controller 300.

The access approving unit 205 receives the message according to the second access and determines whether to allow the access by comparing a waiting ticket included in the second access message with an allowable ID stored in the basic information storage 210. In this case, the access approving unit 205 allows the access if the sequence number of the waiting ticket is smaller than the number of the allowable ID.

According to control of the access approving unit 205, the waiting time calculation unit 206 calculates a waiting time corresponding to a waiting ticket number of a user terminal 100 of which access is not allowed by using the EPS stored in the basic information storage 210, and provides the calculated waiting time to the user terminal 100. For example, when the waiting ticket number of the user terminal 100 is 2000, the allowable ID is 1000, and the EPS is 50, the waiting time is calculated to be 20 seconds through the equation (2000−1000)/50.

The resource use monitoring unit 207 monitors receiving of the notification message transmitted from the user terminal 100, and determines the use of resources of a user terminal 100 that has not transmitted the notification message within a predetermined time period to be finished and deletes the corresponding user from the allocation list.

The waiting ticket block storage 208 stores the waiting ticket block having the fixed size and that is provided from the service controller 300. Among waiting tickets of the waiting ticket block stored in the waiting ticket block storage 208, previously issued waiting tickets and available waiting tickets that can be issued are separately marked.

The waiting list storage 209 stores a waiting list having a fixed size, and adds or deletes a waiting ticket to/from the waiting list according to instructions of the waiting ticket providing unit 204. In this case, the waiting list storage 209 arranges added waiting tickets according to numbers thereof and stores the sequentially arranged waiting tickets in the waiting list.

When the waiting list having the fixed size is full, the waiting list storage 209 does not store a waiting ticket with a number that is greater than the highest number of the waiting ticket stored in the waiting list.

The basic information storage 210 stores basic information for access approval. The basic information includes an allowable ID and an EPS, and they are periodically provided by the service controller 300. When receiving the basic information from the service controller 300, the basic information storage 210 deletes previously stored basic information and then stores the currently received basic information.

The allocation list storage 211 stores an allocation list having a variable size, adds a waiting ticket in the allocation list according to instructions of the access approving unit 205, and deletes the corresponding waiting ticket stored in the allocation list according to instructions of the resource use monitoring unit 207.

The issue state notifying unit 212 collects the waiting list and the allocation list respectively stored in the waiting list storage 209 and the allocation list storage 211 at every predetermined time period, and provides the collected waiting and allocation lists to the service controller 300 through the local interface unit 202.

Hereinafter, referring to FIG. 8, a process for issuing a waiting ticket to a user terminal in the waiting ticket management method for the resource allocation control according to the first exemplary embodiment of the present invention will be described.

Figure 8:
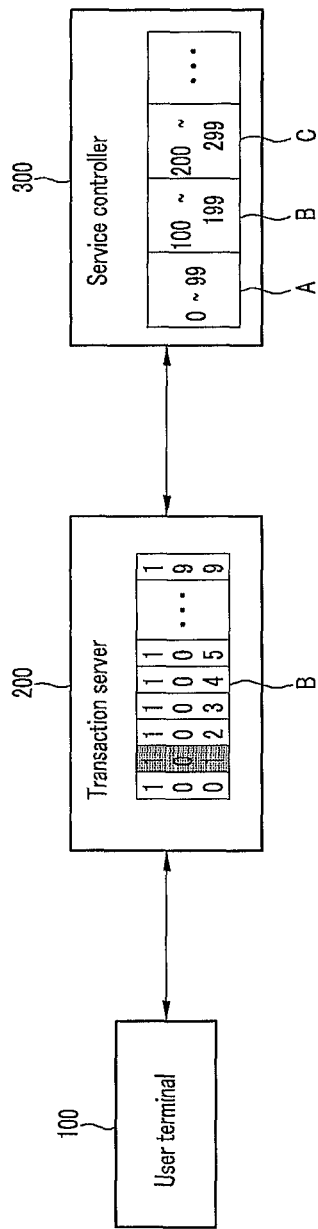
FIG. 8 shows a waiting ticket issuing process according to the first exemplary embodiment of the present invention.

FIG. 8 is provided for describing a waiting ticket issuing process according to the first exemplary embodiment of the present invention, based on the configuration of the network system of FIG. 3. In addition, FIG. 8 shows a case in which issuing of a waiting ticket is performed by using one transaction server 200 according to an exemplary embodiment of the present invention.

The service controller 300 includes a plurality of waiting ticket blocks A, B, C, and so on, each having the same size, and only one of the plurality of waiting ticket blocks is provided to the transaction server 200. In FIG. 8, the service controller 300 provides the waiting ticket block B to the transaction server 200.

Here, each of the waiting ticket blocks has the same size, and this implies that each waiting ticket block has the same number of waiting tickets. For example, as shown in FIG. 8, the waiting ticket block A has 100 waiting ticket blocks (from 0 to 99), and the waiting ticket block B has 100 waiting ticket blocks (from 100 to 199).

When receiving one waiting ticket block, the transaction server 200 provides a waiting ticket included in the received waiting ticket block to the user terminal 100.

If all of the waiting tickets included in the waiting ticket block are respectively provided to user terminals 100, the transaction server 200 requests a new waiting ticket block from the service controller 300. Then, the service controller 300 provides the next waiting ticket block to the waiting ticket block of the transaction server 200 as a new waiting ticket block to the transaction server 200. For example, if the transaction server 200 stores the waiting ticket block B, the service controller 300 provides the waiting ticket block C as the new waiting ticket block to the transaction server 200.

As described, through such an exchange of waiting ticket blocks, the transaction server 200 can provide a sequential waiting ticket to a newly accessed user terminal 100.

Figure 9:
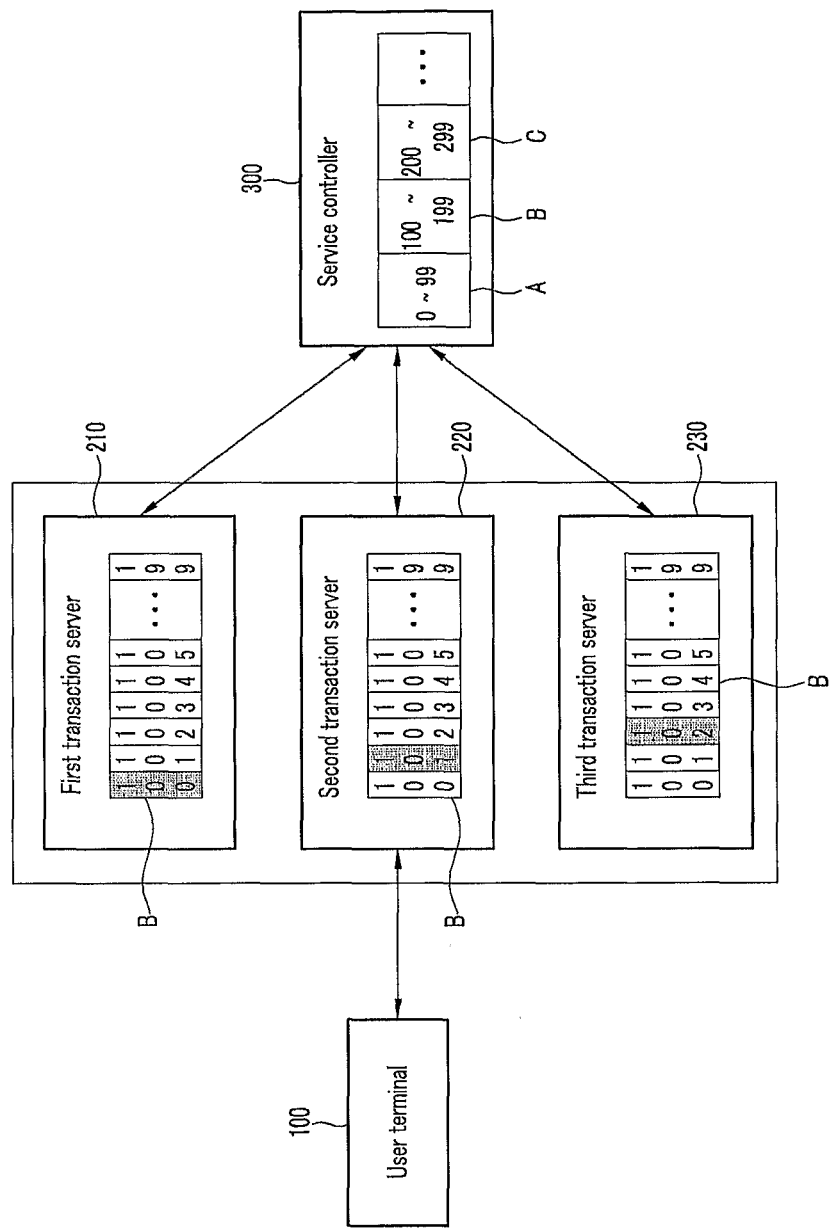
FIG. 9 shows a waiting ticket issuing process according to the second exemplary embodiment of the present invention.

Referring to FIG. 9, a waiting ticket issuing process according to a second exemplary embodiment of the present invention will be described. FIG. 9 is provided for describing a waiting ticket issuing process according to the second exemplary embodiment of the present invention based on the configuration of the network system of FIG. 3.

As shown in FIG. 9, issuing of waiting tickets is performed by using a plurality of transaction servers 210, 220, and 230 according to the second exemplary embodiment the present invention.

A service controller 300 has a plurality of waiting ticket blocks A, B, C, and so on, each having the same size, and only one of the waiting ticket blocks is provided to each of the transaction servers 210, 220, and 230. In FIG. 9, the service controller 300 provides the waiting ticket block B to the respective transaction servers 210, 220, and 230.

When receiving one waiting ticket block, each of the transaction servers 210, 220, and 230 provides a waiting ticket included in the received waiting ticket block to a user terminal 100.

In this case, each of the transaction servers 210, 220, and 230 divides waiting tickets included in the waiting ticket block by the number of transaction servers and sequentially issues waiting tickets obtained from the division to the user terminal 100 according to a waiting ticket number. That is, the transaction server 210 issues waiting ticket 100, waiting ticket 103, waiting ticket 106, . . . waiting ticket 199, the transaction server 220 issues waiting ticket 101, waiting ticket 104, waiting ticket 107, . . . , waiting ticket 197, and the transaction server 230 issues waiting ticket 102, waiting ticket 105, waiting ticket 108, . . . , waiting ticket 198.

In this case, a sequence number of a waiting ticket issued by each of the transaction servers 210, 220, and 230 is an access order of the user terminal. In order to sequentially access user terminals to the respective transaction servers, a load balancing device may be used.

If one of the transaction servers 210, 220, and 230 issues all the waiting tickets allocated to a waiting ticket block thereof to the user terminal 100, the corresponding transaction server requests a new waiting ticket block from the service controller 300 without regard to a waiting ticket issuing state of other transaction servers.

Then, the service controller 300 provides the next waiting ticket block to the waiting ticket block previously provided to each of the transaction servers 210, 220, and 230 as a new waiting ticket block to each of the transaction servers 210, 220, and 230. For example, if each of the transaction servers 210, 220, and 230 has been provided with the waiting ticket block B, the service controller 300 provides the waiting ticket block C as the new waiting ticket block to each of the transaction servers 210, 220, and 230.

When receiving the new waiting ticket block from the service controller 300, each of the transaction servers 210, 220, and 230 stops issuing of waiting tickets from the waiting ticket block in current use, and starts issuing waiting tickets from the new waiting ticket block.

In addition, when another transaction server (not shown) is added to the three transaction servers 210, 220, and 230, the newly added transaction server request a new waiting ticket block from the service controller 300, and accordingly, the service controller 300 provides the new waiting ticket block to each of the four transaction servers. In this case, each of the four transaction servers stops issuing of waiting tickets from the waiting ticket block in current use, and starts issuing waiting tickets from the new waiting ticket block.

Figure 10:
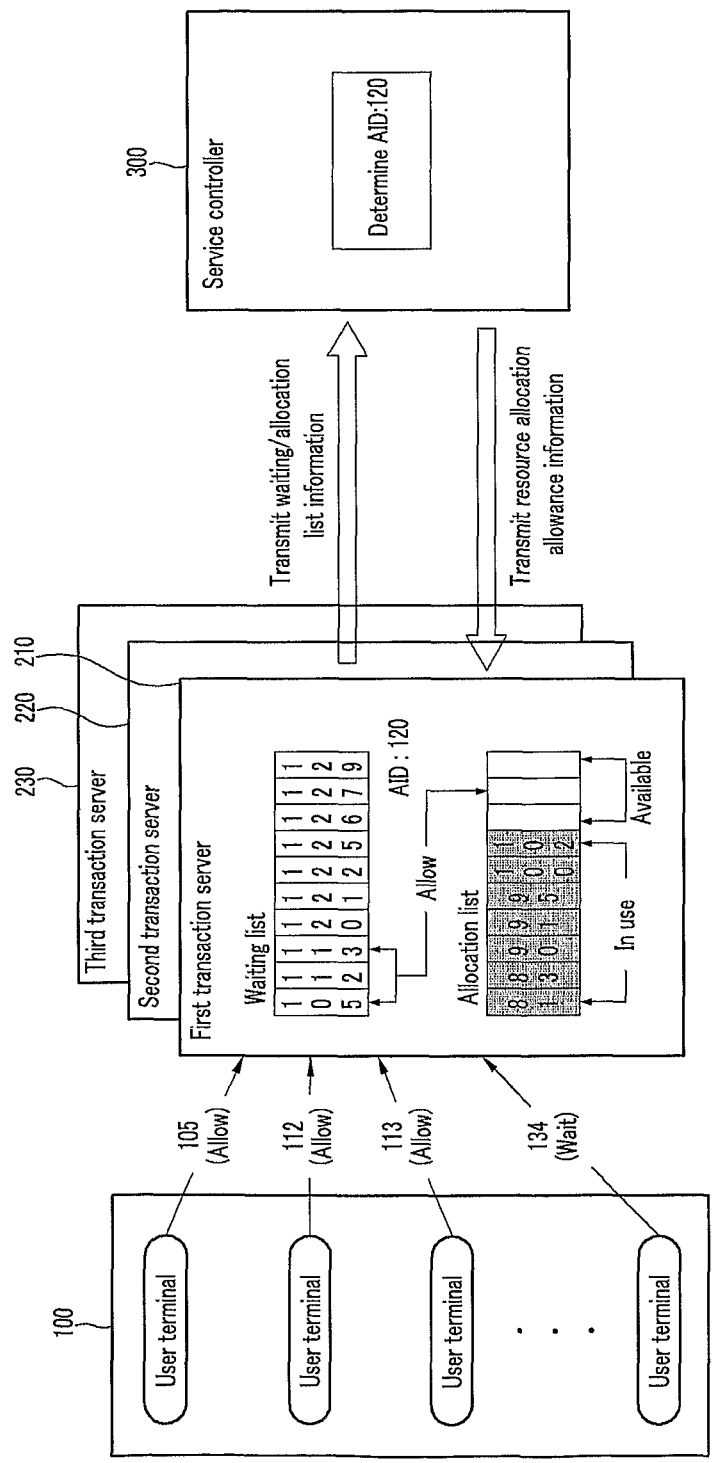
FIG. 10 shows a resource allocation control method according to an exemplary embodiment of the present invention, based on FIG. 9.

Hereinafter, a resource allocation control method will be described with reference to FIG. 10. FIG. 10 shows a resource allocation process according to the exemplary embodiment of the present invention based on FIG. 9.

The service controller 300 collects waiting lists collected from the respective transaction servers 210, 220, and 230 to check user terminals that are waiting, and checks the amount of available resources by allocation lists to set an allowable ID. In FIG. 10, the allowable ID is set to 120.

Accordingly, each of the transaction servers 210, 220, and 230 sets the allowable ID to 120 according to instructions of the service controller 300. When the allowable ID is set, and user terminals 100, each having a unique number, respectively access the respective transaction servers 210, 220, and 230, each of the transaction servers 210, 220, and 230 compares the number of the accessed user terminal 100 with the allowable ID.

When the number of the user terminal 100 is smaller than the allowable ID, each of the transaction servers 210, 220, and 230 allows the access, and when the number of the user terminal 100 is greater than the allowable ID, each of the transaction servers 210, 220, and 230 calculates a waiting time and instructs to wait.

For example, when a first user terminal having a number 105 accesses, the transaction server 210 allows the access of the first user terminal since the allowable ID is 120. In addition, when a second user terminal having a number 112 accesses, the transaction server 210 allows the access of the second user terminal since the allowable ID is 120. However, when a user terminal having a number that is greater than 120 accesses, the transaction server 210 instructs the user terminal to wait.

The numbers of the access-allowed user terminals are deleted from the waiting list and then added to the allocation list.

According to the present invention, a specific user terminal may be allocated with a resource prior to other user terminals by using the discontinuous access management method. For this, unique identification information (e.g., IP address, cellular phone number, or ID/password, etc.) of the specific user terminal is stored for recognition of the specific user terminal, and thus when the specific user terminal accesses, the user terminal can be allocated with the resource prior to other user terminals. That is, when a resource is available, unlike other user terminals, the specific user terminal can be allocated with the available resource without a waiting time.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A discontinuous access management method performed by a network system, the method comprising:
   a) checking whether a resource can be allocated to a first user terminal that has accessed the network system without a waiting ticket;
   b) in the case that the resource cannot be allocated, providing the first user terminal with a first waiting ticket that indicates a first access sequence number of the first user terminal and a first waiting time that indicates a first re-access time of the first user terminal;
   c) disconnecting the first user terminal from the network system after the first user terminal has been provided with the first waiting ticket and the first waiting time;

d) checking whether the resource can be allocated to the first user terminal after the first waiting time has elapsed;

e-1) if the resource can be allocated to the first user terminal after the first waiting time has elapsed according to a result of the checking in d), reconnecting the first user terminal to the network system and allocating the resource to the first user terminal; and e-2) if resource cannot be allocated to the first user terminal after the first waiting time has elapsed according to a result of the checking in d), providing the first user terminal with a second waiting ticket that indicates a second access sequence number of the first user terminal and a second waiting time that indicates a second re-access time of the first user terminal, wherein the first waiting ticket provided to the first user terminal is registered in a waiting list with a unique identifier (ID) of the first user terminal for management in the case that the first user terminal is not allocated with the resource, and the first waiting ticket provided to the first user terminal is registered in an allocation list with the unique ID of the first user terminal for management in the case that the first user terminal is allocated with the resource, and wherein the first waiting time is calculated based on:
an amount of available resources that can be allocated;
an empty resource per second (EPS) value that indicates a quantity of waiting tickets that finish using the resource during a predetermined time period; and
a quantity of user terminals that (1) have been waiting for resource allocation and (2) have an access sequence number that is earlier than the first access sequence number of the first user terminal.

2. The discontinuous access management method of claim 1, further comprising:

f) monitoring for receipt of a resource use notification message from the first user terminal after the resource has been allocated to the first user terminal and, if the message is not received within a predetermined time period, deleting a waiting ticket corresponding to the first user terminal.

3. The discontinuous access management method of claim 1, wherein the first waiting time is calculated based on an amount of available resources that can be allocated and a quantity of user terminals that (1) have been waiting for resource allocation and (2) have an access sequence number that is earlier than the first access sequence number of the first user terminal.

4. The discontinuous access management method of claim 1, wherein the first waiting time is a default value.

5. The discontinuous access management method of claim 1, wherein the waiting list is a fixed-size waiting list and the allocation list is a variable-size allocation list.

6. The discontinuous access management method of claim 1, wherein the EPS value is calculated by using the allocation list.

7. A waiting ticket management method comprising:

a-1) issuing a first waiting ticket to a first user terminal that has accessed a network system without a waiting ticket, wherein the first user terminal is not allocated with a resource associated with the network system, and wherein the first waiting ticket includes an access sequence number of the first user terminal that indicates an access order of the first user terminal to the network system;

a-2) disconnecting the first user terminal from the network system after the first user terminal has been issued the first waiting ticket;

b-1) registering the first waiting ticket of the first user terminal in a waiting list;

b-2) registering a second waiting ticket of a second user terminal that is allocated with the resource in an allocation list, wherein the second waiting ticket includes an access sequence number of the second user terminal that indicates an access order of the second terminal to the network system; and c) deleting the second waiting ticket of the second user terminal after the second user terminal has finished using the resource, wherein a-1) comprises:

a-1a) checking whether the first waiting ticket can be issued from a first waiting ticket block that includes a quantity of sequential waiting tickets;

a-1b) issuing the first waiting ticket to the first user terminal when the first waiting ticket can be issued from the first waiting ticket block; and a-1c) issuing the first waiting ticket from a second waiting ticket block when the waiting ticket cannot be issued from the first waiting ticket block, wherein the second waiting ticket block includes the quantity of sequential waiting tickets, and wherein a lowest waiting ticket number in the second waiting ticket block is sequential to a highest waiting ticket number in the first waiting ticket block, and wherein c) comprises:

c-1) checking whether a resource use notification message is received from the second user terminal; and c-2) deleting the second waiting ticket of the second user terminal from the allocation list if message is not received within a predetermined time period.

8. The waiting ticket management method of claim 7, wherein the waiting list includes a waiting ticket registration field and a waiting ticket registration time field, the waiting list fields have a fixed size, the allocation list includes a waiting ticket registration field and a waiting ticket registration time field, and the allocation list fields have a variable size.

9. A waiting ticket management method performed by a network system comprising a service controller and comprising:

a) checking whether a first waiting ticket issuing device among a plurality of waiting ticket issuing devices can issue a waiting ticket from a first waiting ticket block to a user terminal having accessed a network system without a waiting ticket, wherein the waiting ticket indicates an access sequence number of the user terminal, and a first waiting time that indicates a re-access time of the first user terminal, the first waiting ticket block includes quantity of sequential waiting tickets;

b) requesting a second waiting ticket block from the service controller when the first waiting ticket block has no waiting ticket available to be issued by the first waiting ticket issuing device;

c) in the service controller, upon receiving a request for the second waiting ticket block, providing the second waiting ticket block to each of the plurality of waiting ticket issuing devices, wherein the second waiting ticket block includes the quantity of sequential waiting tickets, and wherein a lowest waiting ticket number in the second waiting ticket block is sequential to a highest waiting ticket number in the first waiting ticket block;

d) setting the second waiting ticket block as a default waiting ticket block for issuing waiting tickets from the plurality of waiting ticket issuing devices;

e) in the first waiting ticket issuing device, issuing the waiting ticket from the second waiting ticket block and providing the waiting ticket to the user terminal; and f) disconnecting the user terminal from the network system after the user terminal has been issued the waiting ticket;

wherein the first waiting time is calculated based on:

an amount of available resources that can be allocated; an empty resource per second (EPS) value that indicates a quantity of waiting tickets that finish using the resource during a predetermined time period; and a quantity of user terminals that (1) have been waiting for resource allocation and (2) have an access sequence number that is earlier than the first access sequence number of the first user terminal.

10. The waiting ticket management method of claim 9, further comprising:

g) registering the waiting ticket in a waiting list managed by the first waiting ticket issuing device; and h) registering the waiting ticket in an allocation list managed by the first waiting ticket issuing device.

11. The waiting ticket management method of claim 10, further comprising:

i) checking whether a resource use notification message is received from the user terminal; and j) deleting the waiting ticket of the user terminal from the allocation list if the message is not received within a predetermined time period.

12. The waiting ticket management method of claim 11, wherein the access sequence number is greater than a previously-issued access sequence number by a quantity of waiting ticket issuing devices in the plurality of waiting ticket issuing devices.

13. The waiting ticket management method of claim 12, further comprising:

k) adding a new waiting ticket issuing device;

Z) requesting, by the new waiting ticket issuing device, a new waiting ticket block from the service controller; and m) providing the new waiting ticket block to each of the plurality of waiting ticket issuing devices, wherein the new waiting ticket block includes the quantity of sequential waiting tickets, and wherein a lowest waiting ticket number in the new waiting ticket block is sequential to a highest waiting ticket number in a most-recently used waiting ticket block.

14. A resource allocation control method comprising:

a-1) allocating a resource associated with a network system to a first user terminal, wherein the first user terminal has a first waiting ticket;

a-2) providing a second waiting ticket to a second user terminal that has accessed the network system without a waiting ticket, wherein the second waiting ticket includes an access sequence number;

a-3) disconnecting the second user terminal from the network system after the second user terminal has been provided with the second waiting ticket;

b-I) registering the first waiting ticket in an allocation list;

b-2) registering the second waiting ticket provided to the second user terminal in a waiting list;

c) calculating an empty resource per second (EPS) value based on the allocation list, and setting an allowable access sequence number based on the EPS value and the waiting list, wherein the EPS value indicates a quantity of waiting tickets that finish using the resource during a predetermined time period;

d) comparing the access sequence number of the second waiting ticket with the allowable access sequence number to determine whether to allocate the resource to the second user terminal;

e-1) if the access sequence number of the second waiting ticket is less than the allowable access sequence number, reconnecting the second user terminal with the network system, allocating the resource to the second user terminal, and deleting the second waiting ticket from the waiting list; and e-2) after deleting the second waiting ticket from the waiting list, registering the second waiting ticket in the allocation list.

15. The resource allocation control method of claim 14, further comprising:

f) recovering the resource allocated to the first user terminal and deleting the first waiting ticket from the allocation list if a resource use notification message is not received from the first user terminal.

* * * * *